United States Patent
Kawano et al.

(10) Patent No.: US 6,903,828 B1
(45) Date of Patent: Jun. 7, 2005

(54) IMAGE PROCESSING APPARATUS

(75) Inventors: Hiroyuki Kawano, Ebina (JP); Hiroshi Sekine, Ebina (JP); Mikihiro Mori, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 924 days.

(21) Appl. No.: 09/583,759

(22) Filed: May 31, 2000

(30) Foreign Application Priority Data

Aug. 31, 1999 (JP) .......................................... 11-244711

(51) Int. Cl.$^7$ .............................................. G06F 15/00
(52) U.S. Cl. ................... 358/1.11; 358/1.18; 358/1.17; 358/1.16; 358/462
(58) Field of Search ............................. 358/1.11, 1.18, 358/1.17, 1.16, 1.12, 1.9, 462, 450, 444; 710/15; 709/217

(56) References Cited

U.S. PATENT DOCUMENTS

| | | | |
|---|---|---|---|
| 6,304,336 B1 * | 10/2001 | Sugaya | 358/1.16 |
| 6,348,975 B1 * | 2/2002 | Tsunekawa et al. | 358/1.17 |
| 6,633,395 B1 * | 10/2003 | Tuchitoi et al. | 358/1.14 |

FOREIGN PATENT DOCUMENTS

| | | |
|---|---|---|
| JP | 9-197775 | 7/1997 |
| JP | 10-65917 | 3/1998 |
| JP | 10-65918 | 3/1998 |
| JP | 10-65919 | 3/1998 |
| JP | 10-65920 | 3/1998 |
| JP | 10-294878 | 11/1998 |
| JP | 11-28839 | 2/1999 |
| JP | 11-32214 | 2/1999 |
| JP | 11-38706 | 2/1999 |
| JP | 11-95502 | 4/1999 |
| JP | 11-196277 | 7/1999 |
| JP | 11-346315 | 12/1999 |

\* cited by examiner

*Primary Examiner*—Twyler Lamb
(74) *Attorney, Agent, or Firm*—Morgan Lewis & Bockius LLP

(57) ABSTRACT

An image processing apparatus of the present invention is provided with an input terminal for inputting a page description language composed of an image-forming command, an analyzing unit for detecting whether image deterioration will occur or not upon printing by analyzing a content of the page description language inputted by the input terminal and a rewriting part for rewriting the content of the inputted page description language according to the result of the detection by the analyzing unit.

18 Claims, 9 Drawing Sheets

FIG.2A
```
Jobstart
Pagestart
Box(x11,y11,x12,y12,fill,c1)
Box(x21,y21,x22,y22,fill,c2)
Pageend
Jobend
```
FIG.2B
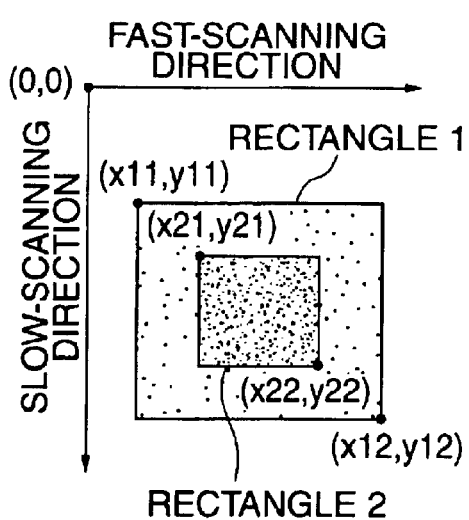
FIG.2C
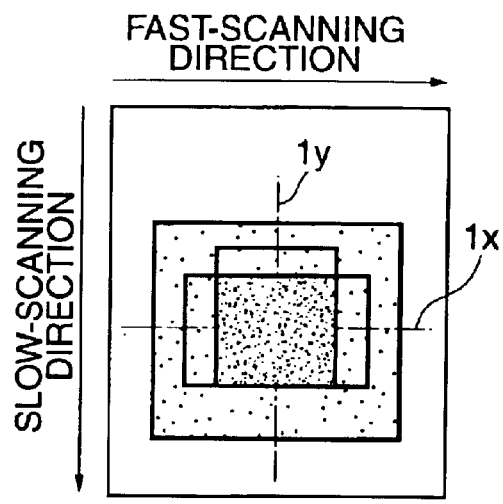
FIG.2D
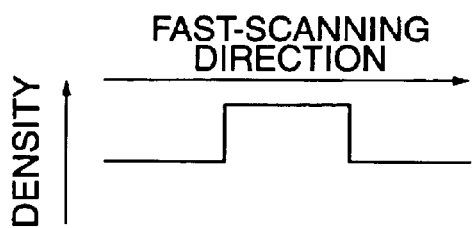
FIG.2E
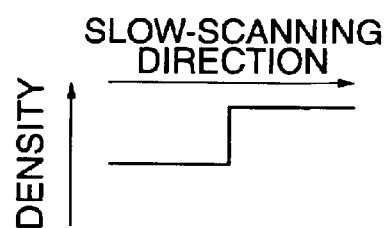
FIG.2F
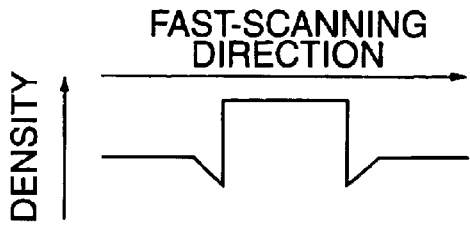
FIG.2G
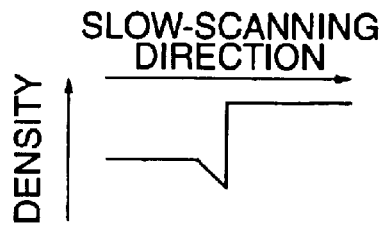

FIG.3A
```
Jobstart
Pagestart
Box(x11,y11,x12,y12,fill,c1)
Box(x21,y21,x22,y22,fill,c2)
Box(x31,y31,x32,y32,grad1,c1,c3)
Box(x41,y32,x31,y42,grad2,c1,c4)
Box(x32,y32,x52,y42,grad2,c5,c1)
Pageend
Jobend
```
FIG.3C
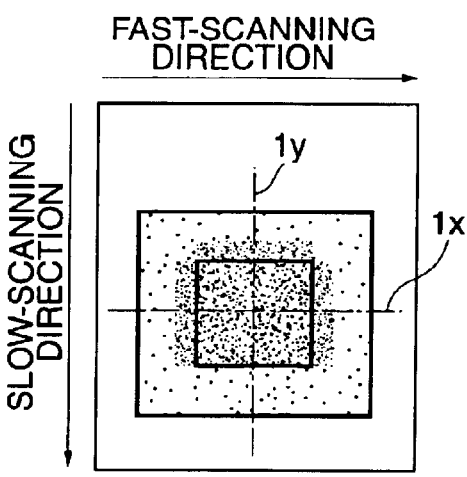
FIG.3B
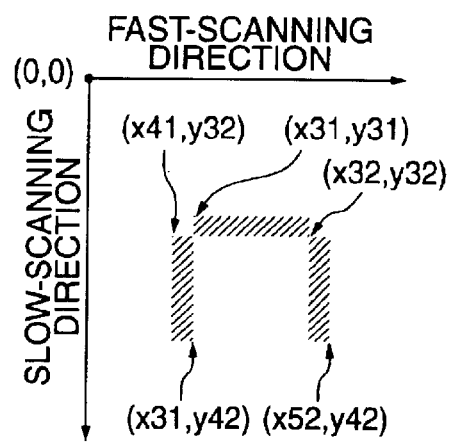
FIG.3D
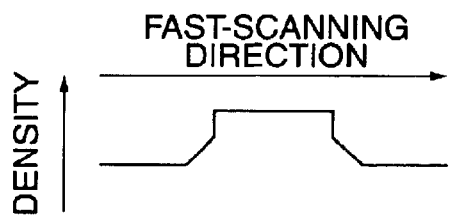
FIG.3E
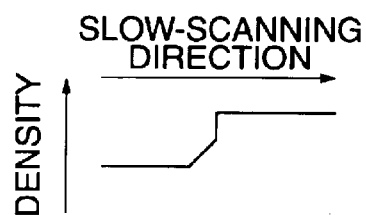
FIG.3F
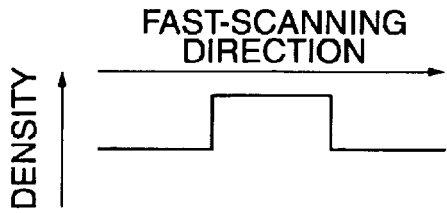
FIG.3G
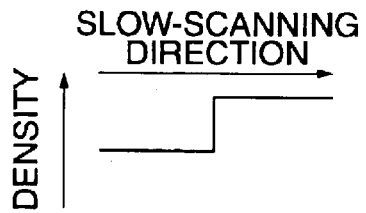

FIG.4A
```
Jobstart
Pagestart
Box(x61,y61,x62,y62,fill,c1)
Circle(x7,y62,r1,fill,c2)
Pageend
Jobend
```
FIG.4B
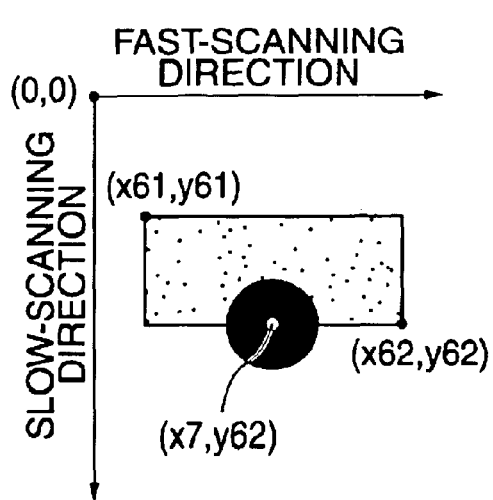
FIG.4C
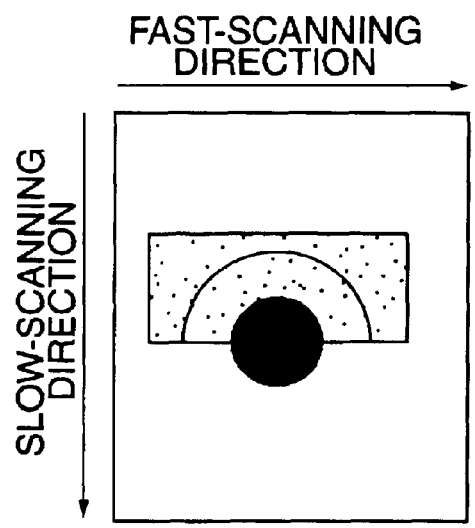

FIG.5A
```
Jobstart
Pagestart
Box(x61,y61,x62,y62,fill,c1)
Arc(x7,y62,rx1,ry1,0,180,fill,c11)
Arc(x7,y62,rx2,ry2,0,180,fill,c12)
    ⋮
Arc(x7,y62,rxn,ryn,0,180,fill,c1n)
Circle(x7,y62,r1,fill,c2)
Pageend
Jobend
```
FIG.5B
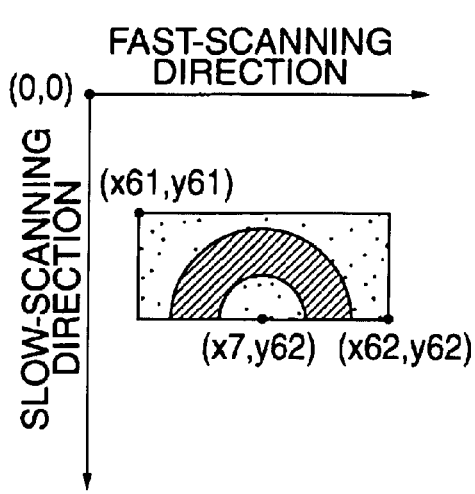
FIG.5C
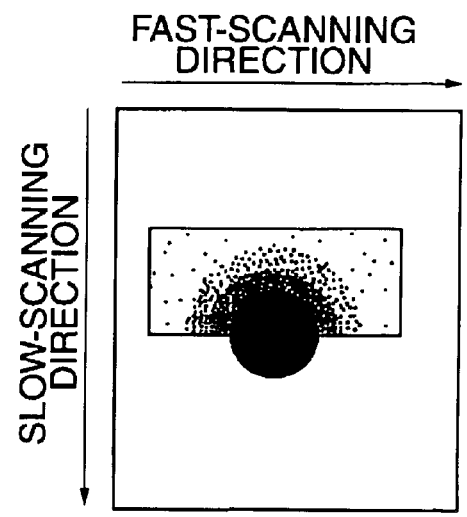

IMAGE PROCESSING APPARATUS

BACKGROUND OF THE INVENTION

1. Field of the Invention

The present invention relates to an image processing apparatus, and more particularly to an image processing apparatus that compensates deterioration in an image quality upon printing.

2. Description of the Prior Arts

In recent years, printers have spread to offices in general and homes. The improvement of their performance has been remarkable. Printers are classified into several types according to its printing method, among which an electrophotographic printer has a feature of high image quality and high productivity.

In this electrophotographic printer, toner is adhered onto an electrophotographic latent image obtained on a photosensitive member according to ON or OFF of a light emitting device such as a laser diode for developing the latent image, and the developed image is transferred to be fixed on an output medium such as a paper sheet or an OHP sheet, whereby a desired printed-out image can be obtained.

However, deterioration in image quality upon transferring is pointed out as described in Japanese Unexamined Patent Applications Nos. HEI 10-65917, HEI 10-65918, HEI 10-65919 and HEI 10-65920. Such deterioration in image quality is roughly classified into three groups, each of which has a different deterioration phenomenon.

A first phenomenon is, as shown in FIG. 10A, that a density of a half-tone density area is decreased at the boundaries of areas of both half-tone density area and background area (normally non-printed) so that an outputted image varies from the half-tone density area to the background area in a slow-scanning direction.

A second phenomenon is, as shown in FIG. 10B, that a density of a half-tone density area is decreased at the boundaries of areas of both half-tone density area and high density area so that an outputted image varies from the half-tone density area to the high density area in a slow-scanning direction.

A third phenomenon is, as shown in FIG. 10C, that a density of a half-tone density area is decreased, in a fast-scanning direction, at the boundary of areas of half-tone density area of an outputted image.

In FIG. 10, a rectangle in which a dot density is high represents a high density area, a rectangle in which a dot density is low represents a half-tone density area and a white rectangle represents a background area, while an area framed by a bold line represents an area where the aforesaid phenomena are generated. Further, FIGS. 11A and 11B are sectional views of FIGS. 10A and 10B respectively and FIG. 11C is a sectional view of FIG. 10C in the fast-scanning direction. A hatched portion represents-a density decreasing amount in FIG. 11.

From the viewpoint of preventing the image deterioration upon printing, Japanese unexamined Patent Applications Nos. HEI 10-65917, HEI 10-65918 and HEI 10-65919 disclose techniques for reducing the aforesaid image deterioration of three types by compensating an image beforehand, while Japanese Unexamined Patent Application No. HEI 10-65920 discloses a technique that a sample image is printed out to set a compensating parameter upon compensating image data, to thereby be capable of easily determining the compensating parameter.

However, in the image processing apparatus disclosed in each Application, compensation processing that requires a great number of reference areas is performed to a raster image, to thereby entail an increase in cost due to an increase of the amount of hardware in the case of executing the processing with hardware. Further, it causes a problem of bringing an increase in processing time and an increase of a used memory area in the case of executing the processing with software. Additionally, it is not necessary to execute the compensation processing in all pages. In the case where a page is formed by a character having the maximum density and a non-printed background, for example, the compensation processing is not required to be executed. However, the image processing apparatus disclosed in each Application does not find the area which should be subject to the compensation processing beforehand, so that it is necessary to judge whether the compensation processing should be performed over the entire area in a page or not as well as to execute compensation processing to the area that is judged to be subject to compensation processing, thereby entailing an increase in processing time.

SUMMARY OF THE INVENTION

The present invention has been made in view of the above circumstances and provides an image processing apparatus having an input part for inputting a page description language composed of an image-forming command, an analyzing part for predicting an image upon printing by analyzing a content of the page description language inputted by the input part, and a rewriting part for rewriting the content of the page description language inputted according to the prediction by the analyzing part.

In the image processing apparatus according to the present invention, the content of the page description language inputted by the input part is analyzed by the analyzing unit for extracting an area where image deterioration is predicted to occur upon printing, and then, the content of the page description language for describing this extracted area is rewritten by the rewriting part, with the result that compensation processing can be performed only to the portion where image deterioration occurs. Further, compensation processing is executed by rewriting of the language, to thereby be capable of performing the processing with a smaller memory capacity.

Moreover, the image processing apparatus according to another aspect of the present invention has an input part for inputting a page description language composed of an image-forming command, an analyzing unit for predicting whether image deterioration will occur or not upon printing by analyzing the content of the page description language inputted by the input part, an image-forming part for forming a raster image according to the content of the page description language inputted by the input part and a compensation processing part for performing, according to the prediction by the analyzing unit, compensation processing on the raster image formed by the image-forming part for reducing image deterioration upon printing.

In this image processing apparatus, the content of the page description language inputted by the input part is analyzed by the analyzing part for extracting an area where image deterioration is predicted to occur upon printing, and then, compensation processing is performed on the raster image corresponding to this extracted area, with the result that the compensation processing can be performed only to the portion where the image deterioration occurs.

Further, the image processing apparatus according to another aspect of the present invention has an input part for inputting a page description language composed of an image-forming command, an analyzing part for predicting whether image deterioration will occur or not upon printing by analyzing the content of the page description language inputted by the input part, an image-forming part for forming a raster image according to the content of the page description language inputted by the input part and an information adding part for adding, according the prediction by the analyzing part, additional information showing at least whether image deterioration will occur or not upon printing to the raster image formed by the image-forming part according to the page description language inputted by the input part.

In this image processing apparatus, the content of the page description language inputted by the input part is analyzed by the analyzing part for extracting an area where image deterioration is predicted to occur upon printing, and then, additional information showing the portion where image deterioration occurs upon printing is added to the raster image corresponding to this extracted area, with the result[]that compensation processing can be performed only to the portion where image deterioration occurs based upon this additional information at the step after this processing or by external processing.

BRIEF DESCRIPTION OF THE DRAWINGS

Preferred embodiments of the present invention will be described in detail based on the followings, wherein;

FIGS. 2A to 2G are views each showing one example of PDL;

FIGS. 3A to 3G are views each showing one example of the rewritten PDL;

FIGS. 4A to 4C are views illustrating an example for forming a circle and a rectangle;

FIGS. 5A to 5C are views illustrating a state wherein the PDL is rewritten;

DESCRIPTION OF THE PREFERRED EMBODIMENTS

Preferred embodiments of an image processing apparatus of the present invention will be explained hereinbelow with reference to the drawings. Briefly explained in detail are a generating model of a density decreasing phenomenon described above that is a factor of deterioration in image quality upon printing as well as compensation processing.

Specifically, as shown in FIG. 10B, FIG. 10C, FIG. 11B and FIG. 11C, a phenomenon that a density is decreased at the half-tone area is generated at the portion where the half-tone area and high-density area are adjacent to each other. The density decreasing amount changes according to a distance from a boundary (referred to an areal boundary hereinafter) of the half-tone area and high-density area. The density decreasing amount can approximately be represented by the following equation (1):

$$\Delta d = d_e (L - \Delta L)/L \quad (1)$$

wherein $\Delta d$ is a density decreasing amount, $d_e$ is a density decreasing amount at the areal boundary, L is a distance from the areal boundary where the density decreasing amount becomes zero and $\Delta L$ is a distance from the areal boundary of a portion where the density decreasing amount is obtained, and further, a relationship of $\Delta L \leq L$ is established.

It is understood from the equation (1) that the density decreasing amount is in proportion to the distance from the areal boundary. Further, it is understood that the density decreasing amount $d_e$ at the areal boundary varies depending upon densities of the half-tone area and high-density area. The density decreasing amount de at the areal boundary generally tends to increase as the density difference between both areas is great and the density at the high-density area is high.

Figure 10A:
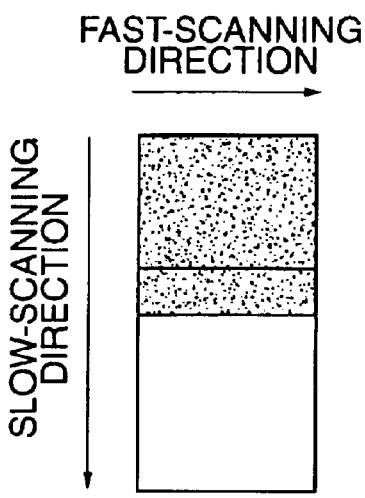
FIGS. 10A to 10C are views illustrating image deterioration.
Figure 10B:
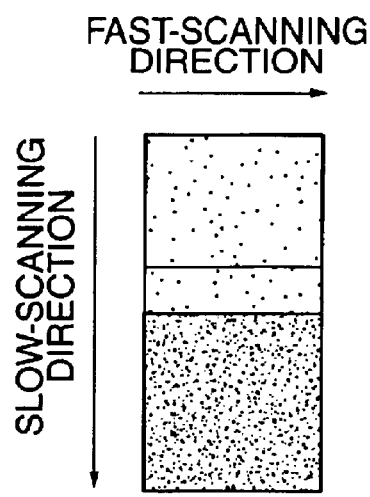
Figure 10C:
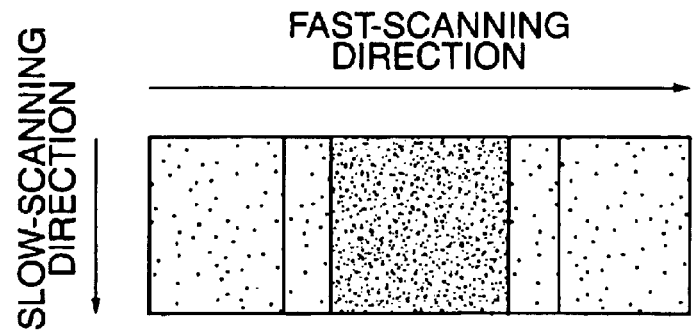
Figure 11A:
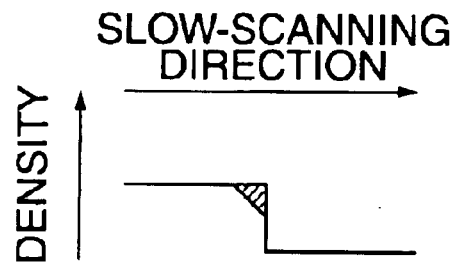
FIGS. 11A to 11C are sectional views illustrating image deterioration.
Figure 11B:
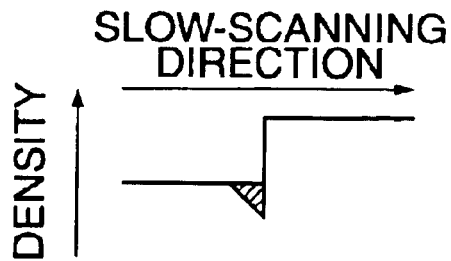
Figure 11C:
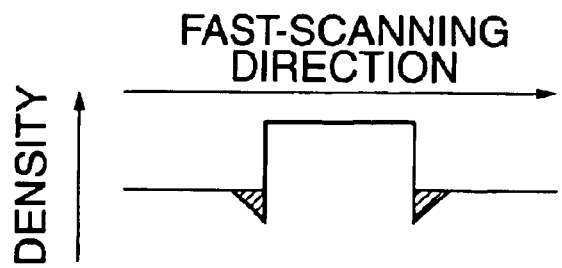

Moreover, a phenomenon that the density is decreased at the half-tone area occurs as shown in FIG. 10A and FIG. 11A at the portion where the half-tone area is adjacent to the background area. In this case, the density decreasing amount can be represented by the above-mentioned equation (1) like the case where the half-tone area is adjacent to the high-density area. It is to be noted that the areal boundary is a boundary between the half-tone area and background area.

Further, the density decreasing amount $d_e$ at the areal boundary generally tends to decrease whether the density at the half-tone area is more than or less than the predetermined density with the predetermined density as a peak. Specifically, in either density decreasing phenomenon, a boundary of the areas each having a different density is detected, a kind of the density decreasing phenomenon that occurs from the densities of both areas as well as the predicted density decreasing amount are calculated and then the density is increased so as to compensate the density decreasing amount, whereby the deterioration in the image quality can be reduced. Although the aforesaid equation (1) is shown as the equation for calculating the density decreasing amount, the process for reducing the deterioration in image quality is the same as above even in the other calculating equation of the density decreasing amount.

First Embodiment

Figure 1:
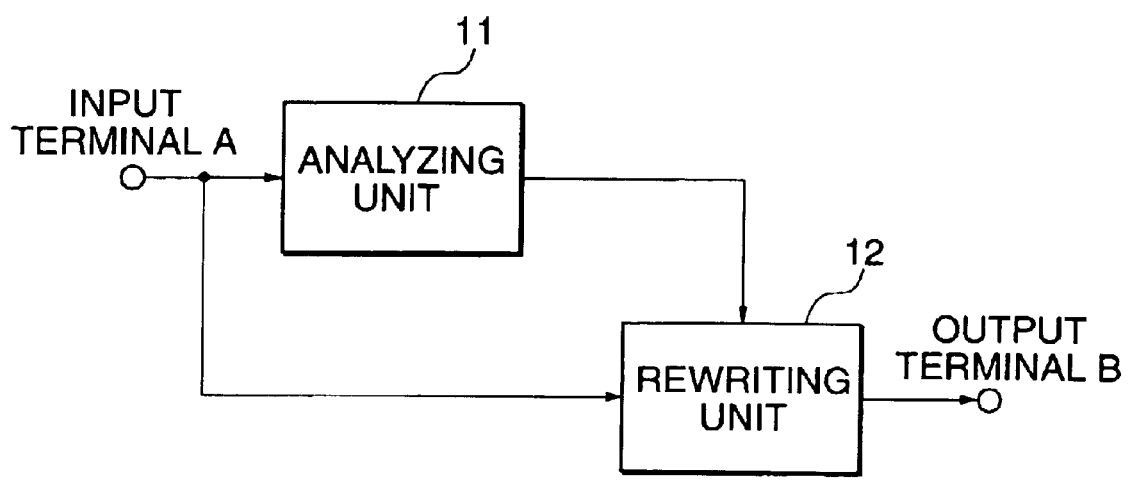
FIG. 1 is a configuration view for explaining a first embodiment.

FIG. 1 is a configuration view for explaining the first embodiment. Specifically, this image processing apparatus is provided mainly with an input terminal A, an analyzing unit 11 and a rewriting unit 12.

The input terminal A inputs a page description language (referred to simply as PDL hereinafter) that is composed of an image-forming command and outputted from an external application software or the like. The analyzing unit 11 detects a portion where image deterioration upon printing (referred to simply as image deterioration hereinafter) is predicted from the PDL inputted to the input terminal A, and then, outputs the detected result to the rewriting unit 12.

The rewriting unit 12 rewrites a content of the PDL inputted to the input terminal A according to the detected result outputted from the analyzing unit 11, and then, outputs to the outside via an output terminal B. The PDL outputted from the output terminal B is converted into a raster image that can be printed out according to its content, and then, printed out.

Explained hereinbelow is a specific operation of the image processing apparatus according to the first embodiment. FIG. 2A shows one example of the PDL inputted to the input terminal A in FIG. 1, wherein Job start represents the beginning of a document, Page start represents the beginning of a page, Box represents a rectangular image-forming command, Page end represents the end of a page and Job end represents the end of the document. Each image-forming command is inputted sequentially from Job start and executed.

Accordingly, in the case where there are plural image-forming commands that are formed on the same area, the image-forming result inputted later by the image-forming command is written over the image-forming result inputted previously by the image-forming command as long as a special instruction is given. Further, factors of the Box command are image-forming start x coordinate, image-forming start y coordinate, image-forming end x coordinate, image-forming end y coordinate, painting-over method and painting-over color in this order from the left. For example, Box (x11, y11, x12, y12, fil1, c1) represents to form a rectangle having a straight line linking the coordinate (x11, y11) with the coordinate (x12, y12) as its diagonal line, and further represents to paint the rectangle with a color designated by c1 so as to paint over the rectangle as represented by fill.

If c1 is a red color and fill represents to fill up the rectangle with the color designated by c1, a rectangle is formed having a straight line linking the coordinate (x11, y11) with the coordinate (x12, y12) as its diagonal line, the inside of which is painted over with red. The coordinates represent from the left a coordinate value of a fast-scanning direction and a coordinate value of a slow-scanning direction, and have the origin at the upper-left edge of the output medium.

There are two Box commands in the example of the PDL shown in FIG. 2A, so that two rectangles are formed shown in FIG. 2B. In two rectangles, the outer rectangle (rectangle 1) is filled up with a color designated by c1 and the inner rectangle (rectangle 2) is filled up with a color designated by c2. If c1 represents 20% gray, and c2 represents black, the rectangle 1 is filled up with 20% gray and the rectangle 2 is filled up with black.

Therefore, when the PDL illustrated in FIG. 2A is converted into a raster image that can be printed out, two areas each having different density with the outline of the rectangle 2 as its boundary are formed to be adjacent to each other. In the case where the combination of the densities of both rectangles is included in the combination of the densities from which the image deterioration is predicted, the image deterioration is, for example, predicted to be generated at the portion shown by a bold line frame in FIG. 2C.

Specifically, the density of the area of the rectangle 1 in the vicinity of the outline of the rectangle 2 is decreased as understood from sectional views taken along lines of 1x and 1y of the image data that is not printed out shown in FIG. 2D and FIG. 2E as well as sectional views taken along lines of 1x and 1y of the image data that is already printed out shown in FIG. 2F and FIG. 2G.

The analyzing unit 11 detects the combination of the image-forming command that forms a portion on which the image deterioration is predicted as described above, and then outputs the result to the rewriting unit 12. It is needless to say that, as understood from the aforesaid equation (1), the condition for generating the image deterioration depends not only upon the combination of the densities of two areas but also upon a distance from the boundary of two areas. Further, the distance for establishing the density decreasing amount of zero varies with the combination of the densities of two areas. Accordingly, whether the compensation processing is performed or not may be determined with the distance from the boundary of two areas as the judging condition.

It is assumed that each of two areas has a length to some extent in the equation (1). However, it has been known that the density decreasing amount is different even if the combination of the densities of two areas are equal to each other particularly in the case where a length of the high-density area such as one pixel, which is insufficient. In an extreme case, image deterioration may not be generated. Therefore, whether the compensation processing is performed or not may be determined with the lengths of two areas as its judging condition.

The rewriting unit 12 executes rewriting of the image-forming command that forms an image at the portion which is judged by the analyzing unit 11 that the image deterioration is predicted to occur. Specifically, it rewrites the image-forming command at the portion shown by the bold line frame in FIG. 2C where the image deterioration is predicted to occur for compensating the image deterioration at this portion.

FIG. 3A shows an example of the PDL that is rewritten by the rewriting unit 12. The first to fourth lines and eighth to ninth lines in FIG. 3A are the same as the first to fourth lines and fifth to sixth lines in FIG. 2A. On the other hand, the fifth to seventh lines in FIG. 3A are the rectangular image-forming commands that are rewritten by the rewriting unit 12 so as to form a gradational rectangle for overcoming the image deterioration having a characteristic shown by the equation (1).

Factors of this image-forming command are image-forming start x coordinate, image-forming start y coordinate, image-forming end x coordinate, image-forming end y coordinate, painting-over method, painting-over color 1 and painting-over color 2 in this order from the left. For example, Box (x31, y31, x32, y32, grad1, c1, c3) represents to form a rectangle having a straight line linking the coordinate (x31, y31) with the coordinate (x32, y32) as its diagonal line, and further represents to fill up the rectangle with a gradation pattern in which the upper limit of the density is a color designated by c1 and the lower limit of the density is a color designated by c3.

FIG. 3B shows a rectangle that is formed by the rectangular image-forming command added to insert by the rewriting unit 12. The shaded portion represents that this portion is a gradation area. Here, the direction approaching the coordinate origin (upper-left corner of the output medium) in the fast-scanning direction is rendered to be the left side, while the direction approaching the coordinate origin in the slow-scanning direction is rendered to be the upper side. When grad1 represents to form a gradational rectangle in which the upper edge thereof is painted with a color designated by c1 and the lower edge thereof is painted with a color that is designated by c2 as well as lineally varies its density in the slow-scanning direction, and when grad2 represents to form a gradational rectangle in which the left edge thereof is painted with the color designated by c1 and the right edge thereof is painted with the color that is designated by c2 as well as lineally varies its density in the fast-scanning direction, a diagram shown in FIG. 3C can finally be obtained.

The colors represented by c3 to c5 may be determined according to the colors represented by c1 and c2 as well as according to the equation (1) in FIG. 3A. FIG. 3D and FIG. 3E are sectional views taken along lines of 1x and 1y of the image data shown in FIG. 5C and FIG. 3F and FIG. 3G are sectional views taken along lines of 1x and 1y of the image data upon printing the image data shown in FIG. 3C. FIG. 3D and FIG. 3E represent that the image subject to compensation processing for compensating image deterioration by adding the rectangular image-forming command by the rewriting unit 12 is printed out, while FIG. 3F and FIG. 3G represent that the image in which the density increasing amount due to compensation processing and the density decreasing amount upon printing are offset to reduce image deterioration is printed out.

Specifically, the addition of the rectangular image-forming command by the rewriting unit 12 brings an effect which is equal to the effect obtained by performing the same density increasing process in the raster image. In addition, this processing can be realized with a smaller amount of hardware in the case of executing the processing with hardware, while it can be realized with a smaller consuming amount of a system sharing resource such as a memory as well as with high speed in the case of executing the processing with software, compared with the raster image processing.

Although the first embodiment is explained, the case other than the combination of the image-forming command illustrated in the above explanation is the same as above. Specifically, from the fact that the portion where image deterioration is predicted to occur is in the vicinity of the boundary of the half-tone area and high-density area or in the vicinity of the boundary of the half-tone area and the background area, as well as the fact that the density decreasing amount does not depend upon the shape of the boundary of both areas but upon the combination of the densities of both areas, the same process is possible even in the case of the other combination such as the combination of the circular image-forming command and the rectangular image-forming command.

The combination of the circular shape and the rectangular shape is explained here. For example, in the case where the PDL shown in FIG. 4A is inputted to the input terminal A, a circular shape is formed on the rectangular shape shown in FIG. 4B. In FIG. 4A, circle (x7, y62, r1, fill, c1) is a circular image-forming command for forming a circular shape having a radius r1 with the coordinate (x7, y62) as its center, this circular shape being filled up with a color designated by c1. The other is the same as the PDL illustrated in FIG. 2A. Further, in FIG. 4, x7, y62 and r1 satisfy the following conditions wherein:

X61<x62

Y61<y62

X61+r1<x7<x62−r1

In this case, image deterioration is predicted to occur at the area circled by a bold line. Therefore, the gradation pattern having a density gradation for compensating image deterioration may be formed at the area where image deterioration is predicted to occur like the aforesaid embodiment. The shape of the boundary of the low-density area (background area) and the high-density area (circular area) becomes an arc, which is different from the above-mentioned embodiment, so that it is necessary to consider image deterioration in both of the fast-scanning direction and slow-scanning direction.

In this case, the shape of the gradation pattern for compensating image deterioration is found to be an area that is present in the ellipse (circle) having the center same as that of the aforesaid circle as well as present in the aforesaid rectangle, and further present at the outside of the aforesaid circle.

When the gradation pattern is formed before forming the circle by paying attention to the describing order of each command and the forming order of the object, the gradation pattern that has originally a complicated shape can be formed easily. Further, as for the gradation pattern of the ellipse (circle), ellipses or circles that are similar to one another each having a higher density as the radius becomes small are formed on the concentric circle in the order from the one having a low density (i.e., in the order from the one having a large radius), and then, the aforesaid circle is formed, whereby image deterioration can be compensated like the above-mentioned embodiment by adding the gradation pattern.

FIG. 5A is an example of the PDL illustrated in FIG. 4A to which the gradation pattern is added. In FIG. 5A, Arc (x7, y62, $rx_n$, $ry_n$, 0, 180, fill, $c1_n$) means that ellipses each having a radius of $rx_n$, $ry_n$ in the fast-scanning direction and slow-scanning direction are formed with the coordinate (x7, y62) as its center in the range of an angle of 0° to 180° that is made by a straight line linking a point on the peripheral surface of the ellipse and the center of the ellipse and the fast-scanning direction, and further means that the inside made by the ellipses is painted over with a color designated by $c1_n$.

Additionally, each factor of the command Arc satisfies the following conditions in FIG. 5A wherein:

$rx_1 = r_1 + 1x$ $rx_n = r_1$ $rx_1 > rx_2 > \ldots > rx_n$ $ry_1 = r_1 + 1y$ $ry_n = r_1$ $ry_1 > ry_2 > \ldots > ry_n$ $c1_1 = c1$ $c1_n = c2$ $c1_1 < c1_2 < \ldots < c1_n$ As described above, an image shown in FIG. 5C can be obtained by performing an image-forming according to the PDL shown in FIG. 5A, to thereby be capable of compensating image deterioration upon printing.

Moreover, a single image-forming command and the combination of three or more image-forming commands become a subject to be detected. In the case where there is an image-forming command for painting over the area where the rectangle 1 is formed with a specified color after the aforesaid two rectangular image-forming commands, for example, i.e., in the case where the image-forming result of the aforesaid two rectangular image-forming commands is finally not left, the portion shown in FIG. 2C where image deterioration is predicted to occur may be judged that image deterioration does not occur. Specifically, the analyzing unit 11 assumes what raster image can finally be obtained from the combination of the image-forming command, for example, from the size relationship of the coordinate, whereupon it may detect the portion where image deterioration is predicted to occur from the result thereof.

Second Embodiment

Figure 6:
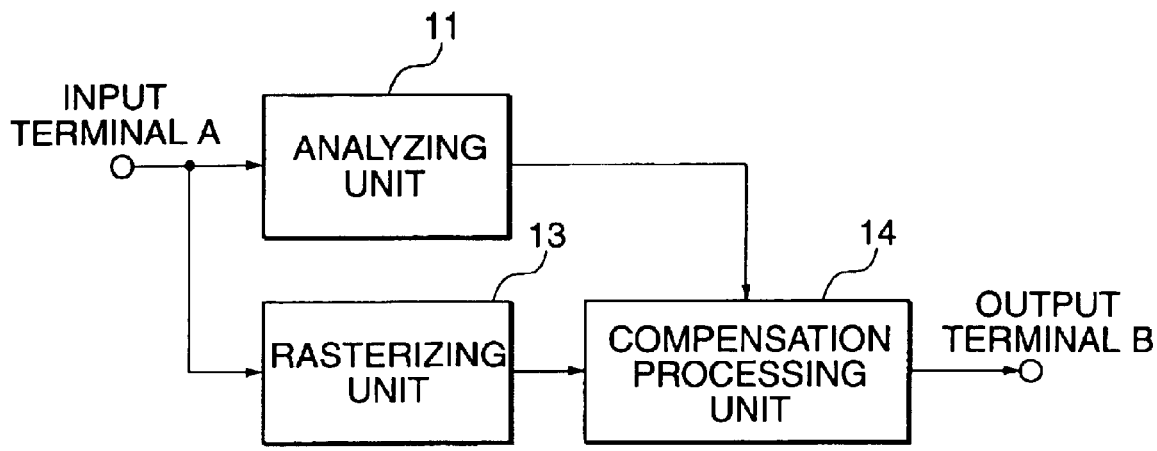
FIG. 6 is a configuration view for explaining a second embodiment.

FIG. 6 is a configuration view for explaining the second embodiment. Specifically, this image processing apparatus is mainly provided with the input terminal A, analyzing unit 11, rasterizing unit 13 and compensation processing unit 14.

The input terminal A inputs a PDL composed of an image-forming command outputted from the external application software or the like. The analyzing unit 11 detects a portion where image deterioration is predicted to occur from the PDL inputted to the input terminal A and outputs the detected result to the compensation processing unit 14.

The rasterizing unit 13 converts the PDL inputted to the input terminal A into a raster image according to its content and outputs the resultant to the compensation processing unit 14. The compensation processing unit 14 performs compensation processing on the raster image outputted from the rasterizing unit 13 according to the detected result outputted from the analyzing unit 11 and then outputs the resultant to the output terminal B.

The raster image that is subject to the compensation processing at the compensation processing unit 14 is printed out by a print engine that is not shown and used at the step after that. A specific operation of the second embodiment will be explained hereinbelow. It is to be noted that the operation of the analyzing unit 11 is the same as that in the first embodiment, so that the explanation is omitted here.

The rasterizing unit 13 interprets the PDL inputted to the input terminal A one line by one line in the order from the one priorly inputted. If it is judged to be suitable for the PDL form, the rasterizing unit 13 produces the raster image at a memory not shown according to the content of the line. In the case where the PDL shown in FIG. 2A is inputted to the input terminal A, for example, the first line and sixth line are print job commands so that the raster image is not produced at the memory, while setting or resetting of the job parameter such as the number of the printed copies, and printing mode is executed as the need arises.

Further, second line and fifth line are page control commands, so that the raster image is not produced at the memory, while setting or resetting of a page parameter for designating a printing sheet or the like is executed as the need arises. On the other hand, the third line and fourth line are image-forming commands and the Box command is a rectangular image-forming command. Therefore, the memory address corresponding to the area where the raster image should be produced and a pixel value of the raster image are calculated according to the coordinate which is clearly represented to the factor of the command or which is suggestively represented in such a case where a factor is omitted by the setting of the default value as well as according to a formed object (referred to simply be "formed object" hereinafter), and then, the calculated pixel value is written into the calculated memory address.

In the case of the Box command shown at the third line in FIG. 2A, the coordinates at the start point and end point of the diagonal line of the rectangle are clearly designated at the factors x11, y11, x12, y12, whereby a writing start address and writing end address can be calculated from these coordinates.

Moreover, the painting-over method of the rectangle and its color are clearly designated in the factor fill and factor c1, so that the pixel value written to the memory can be calculated from these factors. The writing pixel value and the address to which the pixel value is written vary depending upon the designation and the resolution of the print engine that is for printing out the document.

After all, the PDL shown in FIG. 2A is converted into the raster image shown in FIG. 2C and then outputted to the compensation processing unit 14. The operation of the rasterizing unit 13 is explained above taking the input example of the PDL shown in FIG. 2A. However, the image-forming command is not limited to the Box command. Specifically, the operation of the rasterizing section 13, i.e., a series of operations of checking suitability in the order from the one priorly inputted to the input terminal A, interpretation and production of the raster image do not change even in the case of the other image-forming command such as a character line forming command, diagram forming command such as a circle other than a rectangle or a raster image forming command for directly forming a raster image.

The compensation processing unit 14 performs the compensation processing on the raster image outputted from the rasterizing section 13 according to the analyzed result outputted from the analyzing unit 11 and outputs the resultant to the output terminal B. In the case where the PDL shown in FIG. 2A is inputted to the input terminal A and the analyzing unit 11 judges that image deterioration is predicted to occur in the vicinity of the boundary of two rectangles, i.e., in the vicinity of the outline of the rectangle formed by the Box command at the fourth line, for example, then the compensation processing unit 14 performs compensation processing on this portion and outputs the resultant to the output terminal B.

The compensation processing here is the processing for compensating the image deterioration having a characteristic represented by the equation (1). In the case where the PDL shown in FIG. 2A is inputted to the input terminal A, compensation processing is performed on the portion of the image outputted from the rasterizing unit 13 shown in FIG. 3B, and the image shown in FIG. 3C is outputted to output terminal B.

Specifically, the printed-out image outputted from the output terminal B of the image processing apparatus in this embodiment is the same as the printed-out image of the image obtained by the rewritten PDL outputted from the output terminal B of the image processing apparatus in the first embodiment. However, the compensation of the image deterioration is realized by rewriting of the PDL in the first embodiment, while this embodiment is different from the first embodiment in that compensation of the image deterioration is executed immediately after rasterizing processing.

The portion where the image deterioration is predicted to occur is not detected from the raster image obtained by the rasterizing processing, but detected from the content of the inputted PDL, with the result that compensation processing can accurately be performed with high speed as well as with a smaller consuming amount of the memory area, to thereby be capable of reducing image deterioration upon printing.

Third Embodiment

Figure 7:
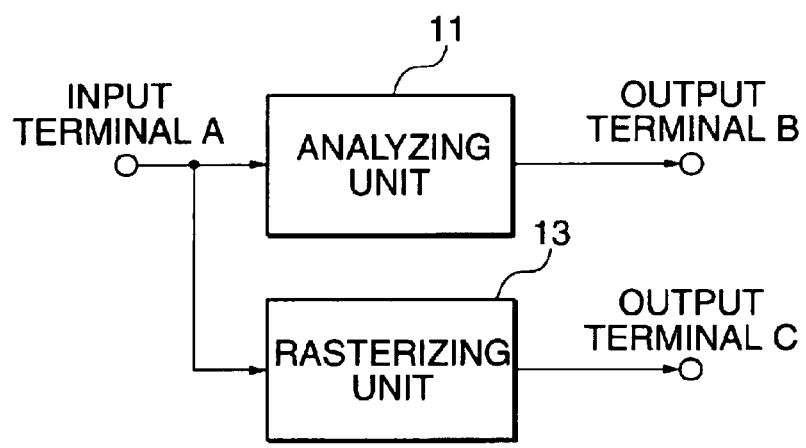
FIG. 7 is a configuration view for explaining a third embodiment.

FIG. 7 is a configuration view for explaining an image processing apparatus in the third embodiment. Specifically, this image processing apparatus is mainly provided with the input terminal A, analyzing unit 11 and rasterizing unit 13. The analyzing unit 11 detects the portion where image deterioration is predicted to occur from the PDL inputted to the input terminal A and then outputs the detected result to the outside from the output terminal B. Further, the rasterizing unit 13 converts the PDL inputted to the input terminal A into a raster image according to its content and then outputs the resultant to the outside from an output terminal C.

Although, in this embodiment, the operation for detecting by the analyzing unit 11 the portion where image deterioration is predicted to occur and the rasterizing processing by the rasterizing unit 13 are the same as those in the second embodiment, it is different from the second embodiment in that the result of the portion where image deterioration is predicted to occur detected by the analyzing unit 11 is outputted as it is from the output terminal B to the outside. Specifically, the compensation processing part is provided at the step after the processing of the image processing apparatus of this embodiment for performing compensation processing on the rater image outputted from the output terminal C according to the detected result outputted from the output terminal B, by which the printed-out image finally obtained is the same as those obtained in the aforesaid two embodiments.

Some recent printers are designed so that the processing performed on the raster image converted from the PDL according to the image-forming content is changed to optimum processing for an image-forming object having different image characteristics such as the character or line image that is to be subject to a smoothing processing or such as a photograph or illustration that is to be subject to a color compensation processing. Thus the printed image having higher image quality can be obtained by these printers compared with the case where the same processing is performed on the entire raster image. In this case, generally attribute information is added pixel by pixel to the raster image according to the image-forming content upon converting the PDL into the raster image and then processing corresponding to the attribute information is performed at the step after that.

This attribute information is represented such that an attribute of a corresponding pixel (for example, sorting information such as character, and a photograph) is represented as a signal of a predetermined bit number. In the case where, in the correspondence of the attribute information with the state of each bit of the signal (referred to simply as attribute mapping, hereinafter), the amount of the allotted attribute information is small with respect to the number of all states that the signal can represent, i.e., there is a space in the attribute mapping, the aforesaid detected result can be included into the attribute information. Considering that a part for generating the attribute information is added to this embodiment, the attribute information is generated according to a type of the image-forming command in addition to the detected condition whether image deterioration is predicted to occur or not in the detecting processing at the analyzing unit 11, whereupon the processing including compensation processing for compensating image deterioration is performed according to the attribute information at the step after this embodiment, whereby the printed-out image having high image quality can be obtained. Further, even in the case where there is no space in the attribute mapping, the bit number of the attribute information can be increased.

Explained here is an example, as a technique to which the aforesaid each embodiment can be adopted, wherein a user who prints out a document by a printer can select whether the compensation processing for compensating the image deterioration is executed or not.

Although the aforesaid compensation processing can be executed with higher speed compared with the conventional technique, the productivity of the printed-out image is reduced compared with the case where the compensation processing is not executed. Therefore, it is desirable not to perform compensation processing if the user attaches greater importance to the productivity of the printed-out image than to the image quality.

Therefore, various windows called a graphical user interface (referred to as simply "GUI" hereinafter) that is selectable is used for designating the printing condition in a personal computer (referred to simply as "PC" hereinafter) in which Windows (a trademark of Microsoft Corporation), for example, is installed in the user interface (referred to as simply "IU" hereinafter) for designating the print out condition by the user in a client computer such as a PC in which the user instructs printout or a work station (referred to simply as "WS" hereinafter). The user designates the printing condition by the window and then instructs the execution of the printing operation, whereby a desired document can be printed out under a desired printing condition.

In the case where the designation of the printing condition can be selected, i.e., where the user can select either one of "image quality takes priority" or "speed takes priority", a mouse pointer is moved to point the button area which shows the selection by the user with the GUI that can select only one of plural conditions, and then, a clicking is executed, whereby the aforesaid two printing conditions can be selected.

Figure 8:
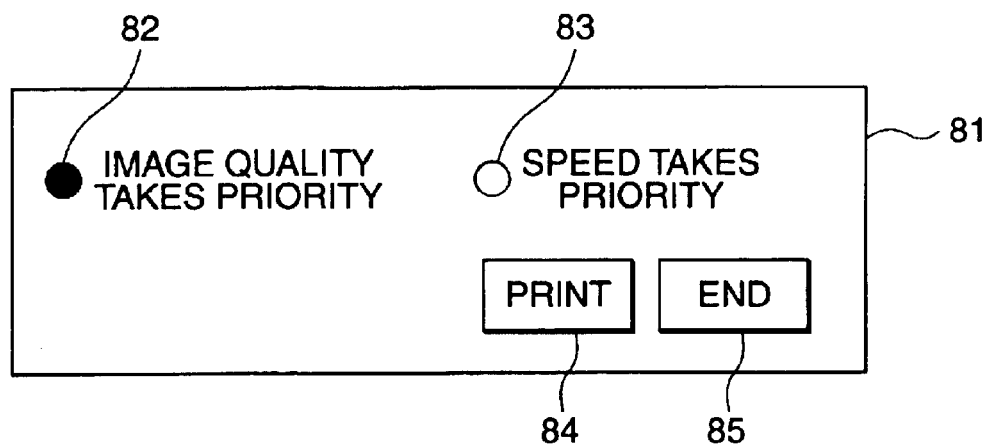
FIG. 8 is a view showing an example of a window of GUI.

FIG. 8 shows one example of the window of GUI. Specifically, buttons 82 and 83 that are present beside "image quality takes priority" and "speed takes priority", respectively, shown in a window 81 is selected by the mouse pointer to be clicked, bringing a result that one of the buttons 82 and 83 is painted over with black so that the corresponding printing condition can be instructed. Thereafter, a printing button 84 is clicked to thereby start the printing operation under the designated printing condition. An end button 85 may be clicked for completing the processing. Additionally, the designation may be performed not only by the mouse but also by a keyboard.

When "image quality takes priority" is selected upon designating the aforesaid printing condition, the above-mentioned compensation processing is executed, while the above-mentioned compensation processing is not executed when "speed takes priority" is selected, whereby an printed-out image having high productivity can be realized.

Figure 9:
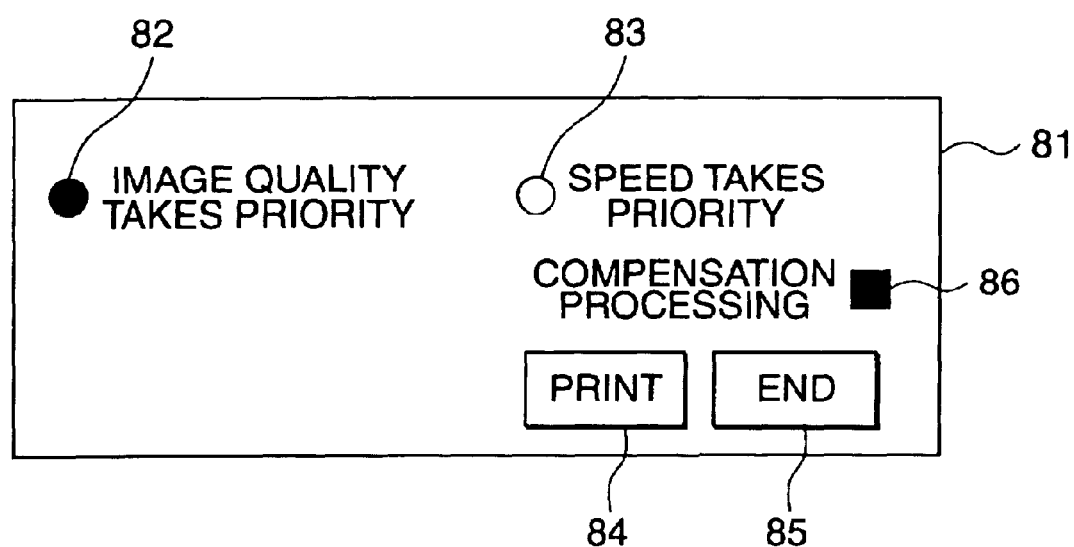
FIG. 9 is a view showing an example of another window of GUI.

Further, FIG. 9 is a view showing another window of GUI. A button 86 for selecting whether compensation processing is performed or not is provided to this window 81 in addition to the button 82 for selecting "image quality takes priority" and the button 83 for selecting "speed takes priority". The printing button 84 and the end button 85 are the same as those in the example shown in FIG. 8.

In a window 81 like this, the execution of compensation processing can be independently selected by the button 86. Specifically, even in the case where the button 82 for selecting "image quality takes priority" is selected, the button 86 is selected to be painted over with white when the compensation processing is not performed. This process can cause the compensation processing not to be performed even though the other processing such as smoothing or the like is executed. On the other hand, even in the case where the button 83 for selecting "speed takes priority" is selected, the button 86 is selected to be painted over with black when only compensation processing is intended to be performed. This process can cause the compensation processing only to be performed without executing other processing such as smoothing.

There is a case where a button is provided for instructing the printing operation by application software without using a window for setting the aforesaid printing condition. When a user pushes this button, a document is printed out under the printing condition of a default at a printer which is designated as a device having top priority with respect to the output.

In this case, the user cannot select whether the compensation processing is performed or not. However, whether compensation processing is executed or not can be selected according to a kind of application software for executing the printing operation. One example of such selection is that compensation processing is not executed in the case of application software which deals mainly with characters like word processing software, and another example is that compensation processing is executed in the case of application software which deals mainly with diagrams and photographs like photoretouch. software.

In this case, the user does not directly select whether the compensation processing is executed or not. However, if the compensation processing is set so as to be automatically executed when the printing operation is executed with application software which deals with a document on which image deterioration is liable to occur upon printing, time and labor of the user for setting the printing condition can be saved as well as the image deterioration and productivity upon printing can be prevented from being reduced.

As explained above, the following effects can be obtained according to the image processing apparatus of the present invention. Specifically, compared with the conventional technique in which the portion where image deterioration is predicted to occur is detected from the content of the raster image for executing compensation processing, it can be realized with less hardware when it is realized with hardware, as well as it can be realized with less memory capacity required for the operation with high speed when it is realized with software, and further, image deterioration upon printing can be reduced.

What is claimed is:

1. An image processing apparatus comprising:
   an input part that inputs a page description language composed of an image-forming command;
   an analyzing part that predicts an image quality upon printing by analyzing a content of the page description language inputted by the input part; and
   a rewriting part that rewrites the content of the inputted page description language according to the prediction by the analyzing part.

2. An image processing apparatus according to claim 1, wherein the analyzing part predicts whether image deterioration will occur or not upon printing, and the rewriting part rewrites the content of the page description language in case where the analyzing unit predicts that the image deterioration will occur.

3. An image processing apparatus comprising:
   an input part that inputs a page description language composed of an image-forming command;
   an analyzing part that predicts whether image deterioration will occur or not upon printing by analyzing a content of the page description language inputted by the input part;
   an image-forming part that forms a raster image according to the content of the page description language inputted by the input part; and
   a compensation processing part that performs, according to the prediction by the analyzing part, compensation processing on the raster image formed by the image-forming part for reducing image deterioration upon printing.

4. The image processing apparatus according to claim 1, wherein the analyzing part predicts that the image deterioration will occur upon printing when a difference between densities of two adjacent areas is larger than a predetermined threshold value.

5. The image processing apparatus according to claim 1, wherein the analyzing part predicts that the image deterioration occurs upon printing when a distance between each boundary of two adjacent areas is more than a predetermined threshold value.

6. The image processing apparatus according to claim 1, wherein the rewriting part determines whether the rewriting of the page description language is performed or not based upon an instruction from a user.

7. The image processing apparatus according to claim 3, wherein the compensation processing part determines whether the compensation processing is performed or not based upon an instruction from a user.

8. The image processing apparatus according to claim 1, wherein the rewriting part determines whether rewriting of the page description language is performed or not based upon a print mode designated by a user.

9. The image processing apparatus according to claim 3, wherein the compensation processing part determines whether compensation processing is performed or not based upon a print mode designated by a user.

10. The image processing apparatus according to claim 1, wherein the rewriting part determines whether rewriting of the page description language is performed or not based upon a kind of application software that has output the page description language to the input part.

11. The image processing apparatus according to claim 3, wherein the compensation processing part determines whether compensation processing is performed or not based upon a kind of application software that has output the page description language to the input part.

12. An image processing apparatus comprising:
    an input part that inputs a page description language composed of an image-forming command;
    an analyzing part that predicts whether image deterioration will occur or not upon printing by analyzing a content of the page description language inputted by the input part;
    an image-forming part that forms a raster image according to the content of the page description language inputted by the input part; and
    an information adding part that adds, according to the prediction by the analyzing part, additional information showing at least whether the image deterioration will occur or not upon printing in the raster image formed by the image-forming part according to the page description language inputted by the input part.

13. The image processing apparatus according to claim 12, wherein the information adding part determines whether the additional information is added or not based upon a print mode designated by a user.

14. The image processing apparatus according to claim 12, wherein the information adding part determines whether the additional information is added or not based upon a kind of application software that has output the page description language to the input part.

15. The image processing apparatus according to claim 12, wherein the information adding part determines whether the additional information is added or not based upon an instruction from a user.

16. An image processing method comprising:
    inputting a page description language composed of an image-forming command;
    predicting an image upon printing by analyzing a content of the inputted page description language; and
    rewriting the content of the inputted page description language according to the analyzed prediction.

17. An image processing method comprising:
    inputting a page description language composed of an image-forming command;

predicting whether image deterioration will occur or not upon printing by analyzing a content of the inputted page description language;

forming a raster image according to the content of the inputted page description language; and performing compensation processing on the formed raster image for reducing image deterioration upon printing according to the analyzed prediction.

18. An image processing method comprising:

putting a page description language composed of an image-forming command;

predicting whether image deterioration will occur or not upon printing by analyzing a content of the inputted page description language;

forming a raster image according to the content of the inputted page description language; and adding additional information showing at least whether the image deterioration will occur or not upon printing the formed raster image according to the analyzed prediction.

* * * * *